No. 866,990. PATENTED SEPT. 24, 1907.
T. W. VARLEY.
ELECTRICAL MEASURING INSTRUMENT.
APPLICATION FILED SEPT. 7, 1905.
2 SHEETS—SHEET 1.
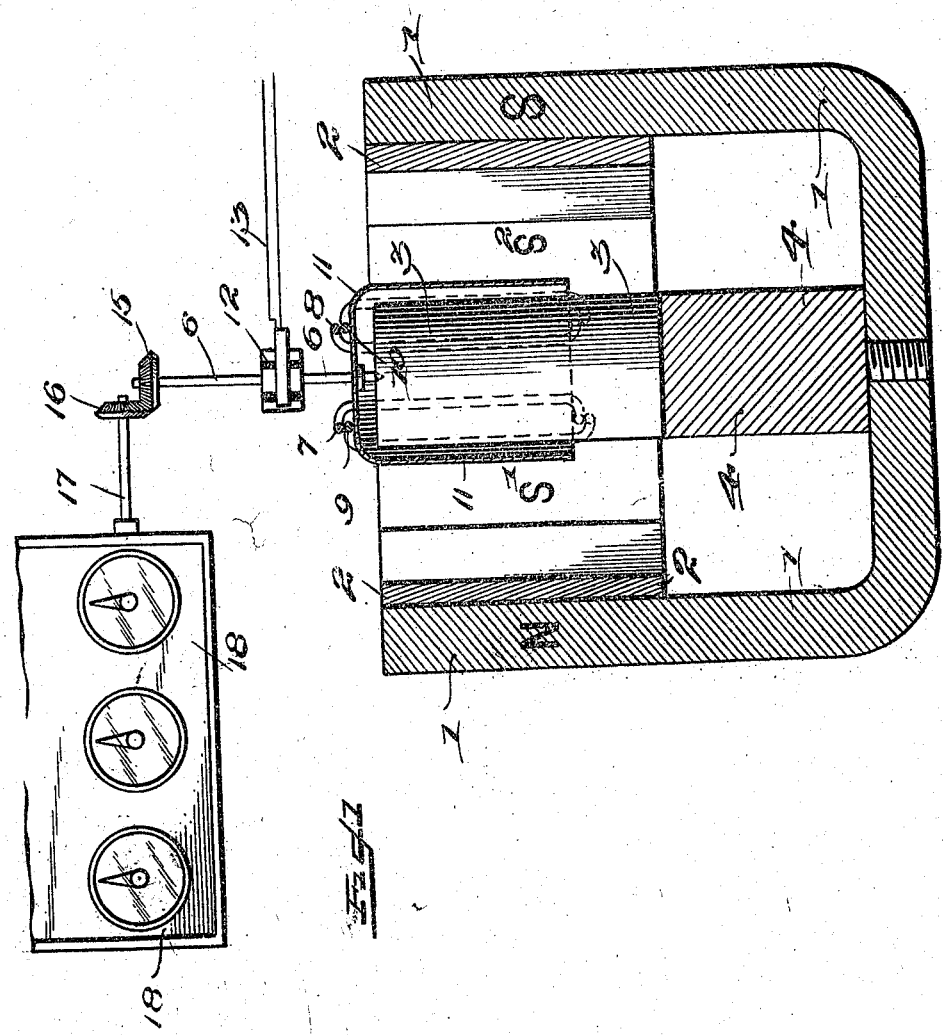
Attest:
Inventor:
Thomas W. Varley
by Seabury C. Masuck
his Atty

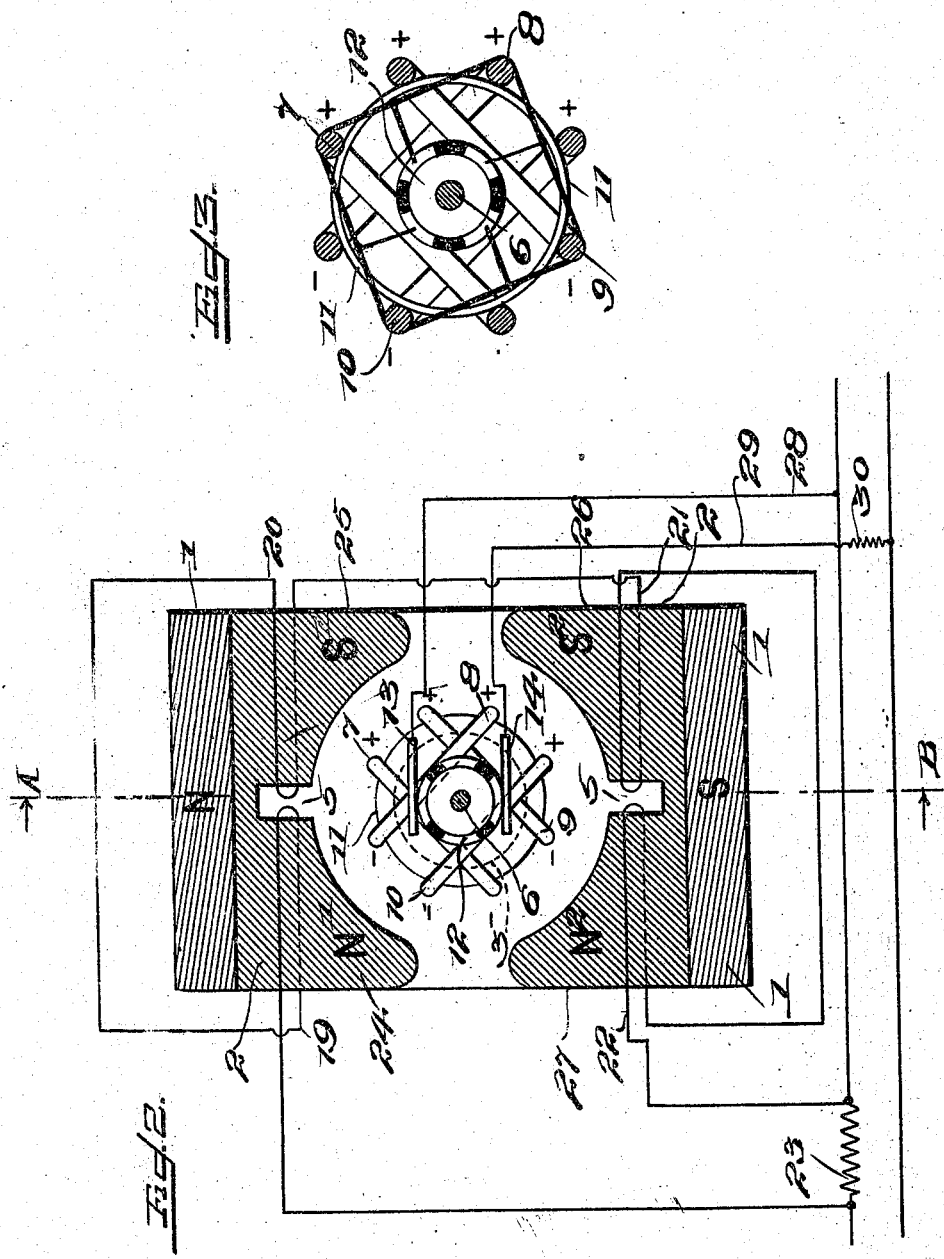

UNITED STATES PATENT OFFICE.

THOMAS W. VARLEY, OF NEW YORK, N. Y.

ELECTRICAL MEASURING INSTRUMENT.

No. 866,990.  Specification of Letters Patent.  Patented Sept. 24, 1907.

Application filed September 7, 1905. Serial No. 277,308.

*To all whom it may concern:*

Be it known that I, THOMAS W. VARLEY, a citizen of the United States, residing in the borough of Manhattan, city of New York, State of New York, have invented a new and useful Improvement in Electrical Measuring Instruments, of which the following is a specification.

My invention relates to electrical measuring instruments wherein advantage is taken of a substantially constant magnetic field in combination with stationary and movable coils so disposed that a current passing through the stationary coil will shift or distort the lines of force of the constant magnet in such manner that they will cause a torque on the movable coil, the function of the stationary coil being simply to so shift the lines of force in the constant magnetic field and not necessarily to create the magnetic field itself as in the ordinary dynamometer.

In the following I have described with reference to the accompanying drawings a structure illustrating one embodiment of my invention, the features thereof being more particularly pointed out hereinafter in the claims.

In the drawings Figure 1 is a side elevation partly in section along the line A—B of Fig. 2 of a structure designed to be used as an integrating watt meter. Fig. 2 is a top plan view of the same, parts being omitted, the connections being shown diagrammatically. Fig. 3 is a detail view to more clearly illustrate the windings of the movable coil.

Similar numerals of reference indicate similar parts throughout the several views.

1 represents a substantially constant magnet here shown in the form of a permanent horseshoe magnet provided with pole pieces 2, 2 of soft iron. A soft iron core 3 of any suitable construction is supported concentrically to the pole pieces, as on a non-magnetic support 4, a suitable air gap being left between the core and the pole pieces. The pole pieces 2, 2 are preferably provided with slots 5, 5. The core 3 forms a bearing for one end of a shaft 6, the other end of the shaft being suitably supported in any convenient manner (not shown). Shaft 6 carries at its lower end windings 7, 8, 9 and 10 constituting the movable or armature coil which are illustrated as surrounding a cup 11, preferably of aluminium, also supported on the lower end of shaft 6. Cup 11 may form an additional supporting means for windings 7, 8, 9 and 10, as illustrated, in addition to the function hereinafter set forth. The windings are preferably connected in series so as to form a closed circuit two-pole armature. Commutator 12 on shaft 6 is provided with brushes 13, and 14 positioned 180 degrees from each other and displaced 90 degrees from the normal position. At the upper end of shaft 6 is a gear 15 meshing with gear 16 on shaft 17 acting to operate suitable means 18 for registering the revolutions of the armature coil.

Windings 19, 20, 21 and 22, constituting the stationary coil whose terminals are connected to a shunt 23 in one leg of the main circuit, are in series with each other and wound respectively around polar projections 24, 25, 26 and 27 on pole pieces 2, 2. Wires 28 and 29 leading to brushes 13 and 14 respectively are shunted to the main circuit through adjustable resistance 30, as shown in Fig. 2.

The operation of the apparatus is as follows: Current enters the armature coil through brushes 13 and 14 and passes through said coil in such manner that in one-half the armature the current is flowing downwards and in the opposite half it is flowing upwards, as in the ordinary two-pole armature and as clearly illustrated in Fig. 3. With no current flowing in the windings of the stationary coil, the armature coil is in a balanced condition relative to the magnetic field and has no tendency to rotate. With current flowing through the stationary coil the polar projections of pole pieces 2, 2 tend to become magnetized as shown by letters N', S', $S^2$, $N^2$, so as to tend to shift the total magnetism across the air gap diagonally thus putting the armature coils in an unbalanced condition and causing rotation thereof. In the form illustrated the diagonal position of the resultant magnetic field will be from polar projection 24 to polar projection 26. Windings 19, 20, 21 and 22 of the stationary coil are so disposed on the respective projections that when current passes through the windings, polar projection 24 tends to increase its magnetism, polar projection 25 tends to decrease its magnetism, polar projection 26 tends to increase its magnetism and polar projection 27 tends to decrease its magnetism thus producing the result described and causing the rotation of the armature coil. Two windings are wound on each pole piece, as illustrated in Fig. 2, in order to keep the total magnetism constant. The total magnetism across the air gap from polar projections 24 and 25 to polar projections 26 and 27 is also constant. The function of cup 11 is to act as a drag to shaft 6 because of the induced currents being set up in it by virtue of its moving through a varying magnetic field resulting in the speed of rotation of the armature being proportional to the product of the current in the stationary coil and the armature coil or the watts of energy delivered to the load making it a watt hour meter.

By slightly changing the position of the brushes a starting tendency can be given to the armature coil in order to overcome initial friction.

It is obvious that the constant magnetic field may be other than a permanent magnet and that the constancy of the field may vary slightly without interfering with the operation of the device as long as the field is substantially constant.

The principle of the invention as shown and described is applicable to either alternating or direct currents and may be utilized in the construction of volt meters and ammeters as well as in either integrating or indicating watt meters, as is clear to any one skilled in the art.

It is further obvious that other details illustrated may be considerably varied and parts and functions transposed without departing from the spirit of my invention, and I do not restrict myself to any of the details as shown and described.

What I claim and desire to secure by Letters Patent of the United States is:—

1. In an apparatus of the character described a substantially constant magnet for creating a field of force, a stationary coil for distorting or displacing said constant field, and a movable coil in a balanced condition with relation to the constant magnetic field when no current is passing through the stationary coil but becoming unbalanced so as to rotate when current is passing through the stationary coil, and so arranged as to form a two-pole armature.

2. In an apparatus of the character described a substantially constant magnet for creating a field of force, a stationary coil for distorting or displacing said magnetic field in a diagonal direction with relation to the poles of said constant magnet, and a movable coil in a balanced condition with relation to the constant magnetic field when no current is passing through the stationary coil and becoming unbalanced so as to rotate when current is passing through the stationary coil.

3. In an apparatus of the character described a substantially constant magnet for creating a field of force, a stationary coil for distorting or displacing said constant field in a diagonal direction with relation to the poles of said constant magnet and a movable coil in a balanced condition with relation to the constant magnetic field when no current is passing through the stationary coil and becoming unbalanced so as to rotate when current is passing through the stationary coil, and so arranged as to form a two-pole armature.

4. In an apparatus of the character described a substantially constant magnet for creating a field of force, pole pieces on said magnet having a plurality of polar projections on each pole piece, a stationary coil for distorting or displacing said constant field and a movable coil in a balanced condition with relation to the constant magnetic field when no current is passing through the stationary coil and becoming unbalanced so as to rotate when the current is passing through the stationary coil, and so arranged as to form a two-pole armature.

5. In an apparatus of the character described a substantially constant magnet for creating a field of force, pole pieces on said magnet having a plurality of polar projections on each pole piece, a stationary coil for distorting or displacing said constant magnetic field in a diagonal direction with relation to the poles of said constant magnet and a movable coil in a balanced condition with relation to the constant magnetic field when no current is passing through the stationary coil and becoming unbalanced so as to rotate when current is passing through the stationary coil.

6. In an apparatus of the character described a substantially constant magnet for creating a field of force, pole pieces on said magnet having a plurality of polar projections on each pole piece, a stationary coil for distorting or displacing said constant field in a diagonal direction with relation to the poles of said constant magnet and a movable coil in a balanced condition with relation to the constant magnetic field when no current is passing through the stationary coil and becoming unbalanced so as to rotate when the current is passing through the stationary coil and so arranged as to form a two-pole armature.

7. In an apparatus of the character described a substantially constant magnet for creating a field of force, pole pieces on said magnet having a plurality of polar projections on each pole piece, a stationary coil for distorting or displacing said constant field in a diagonal direction with relation to the poles of said constant magnet and a movable coil in a balanced condition with relation to the constant magnetic field when no current is passing through the stationary coil and becoming unbalanced so as to rotate when the current is passing through the stationary coil and so arranged as to form a two-pole closed circuit armature.

In witness whereof I have hereunto signed my name in the presence of two subscribing witnesses.

THOMAS W. VARLEY.

Witnesses:
SEABURY C. MASTICK,
T. FRANK WOODSIDE.